(12) United States Patent
Rodgers et al.

(10) Patent No.: US 11,767,044 B1
(45) Date of Patent: *Sep. 26, 2023

(54) WIRE CADDY FOR TRANSPORTING AND DISPENSING WIRE OR CABLE

(71) Applicant: Encore Wire Corporation, McKinney, TX (US)

(72) Inventors: Kevin D. Rodgers, Roswell, NM (US); John L. Rhoads, Lewisville, TX (US)

(73) Assignee: Encore WIre Corporation, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,239

(22) Filed: Sep. 27, 2022

Related U.S. Application Data

(63) Continuation of application No. 17/334,768, filed on May 30, 2021, now Pat. No. 11,472,457, which is a continuation of application No. 16/404,460, filed on May 6, 2019, now Pat. No. 11,040,733.

(60) Provisional application No. 62/667,490, filed on May 5, 2018.

(51) Int. Cl.
| | |
|---|---|
| *B62B 1/26* | (2006.01) |
| *H02G 11/02* | (2006.01) |
| *B65H 49/32* | (2006.01) |
| *B65H 49/20* | (2006.01) |

(52) U.S. Cl.
CPC .............. *B62B 1/26* (2013.01); *B65H 49/205* (2013.01); *B65H 49/321* (2013.01); *B65H 49/324* (2013.01); *H02G 11/02* (2013.01)

(58) Field of Classification Search
CPC ... B62B 1/26; B62B 2202/025; B65H 49/205; B65H 49/321; B65H 49/324; B65H 75/40; H02G 11/02
See application file for complete search history.

(56) References Cited

U.S. PATENT DOCUMENTS

| 292,831 | A | 2/1884 | Locke |
|---|---|---|---|
| 11,040,733 | B1 * | 6/2021 | Rodgers ................. H02G 11/02 |
| 11,472,457 | B1 * | 10/2022 | Rodgers .................... B62B 1/26 |

(Continued)

OTHER PUBLICATIONS summitsource.com, "Wire Caddy products", https://www.summitsource.com/Search.aspx?k=tos407, printed from internet May 6, 2019.

(Continued)

*Primary Examiner* — William E Dondero
(74) *Attorney, Agent, or Firm* — WARREN RHOADES LLP

(57) ABSTRACT

An apparatus for the transportation and dispensing of spooled wire or cable, the apparatus including a handle structure wherein the handle structure has a first end and a second end, a first support structure attached to the first end of the handle structure, a second support structure attached to the second end of the handle structure, a first spool center insert attached to the first support structure, a second spool center insert attached to the second support structure, a first leg moveably attached to the first support structure, a second leg moveably attached to the second support structure, and wherein a spool of spooled wire or cable is attached to the first and second spool center inserts during transportation and dispensing of the spooled wire or cable.

20 Claims, 6 Drawing Sheets

(56) References Cited

U.S. PATENT DOCUMENTS

2003/0150953 A1   8/2003  Gent
2012/0298788 A1   11/2012 Winkel et al.

OTHER PUBLICATIONS

Electriduct, "Wire Reel Stand products", https://www.electriduct.com/search.asp?keyword=wire+reel+stand, printed from internet May 6, 2019.
WCT Products, "Reel Rollers products", www.wctproducts.com/search/?q=&qfront=reel+rollers, printed from internet May 6, 2019.
techtoolsupply.com, "Vert Caddy products", https://www.techtoolsupply.com/SearchResults.asp?Search=vert+-caddy, printed from internet May 6, 2019.

* cited by examiner

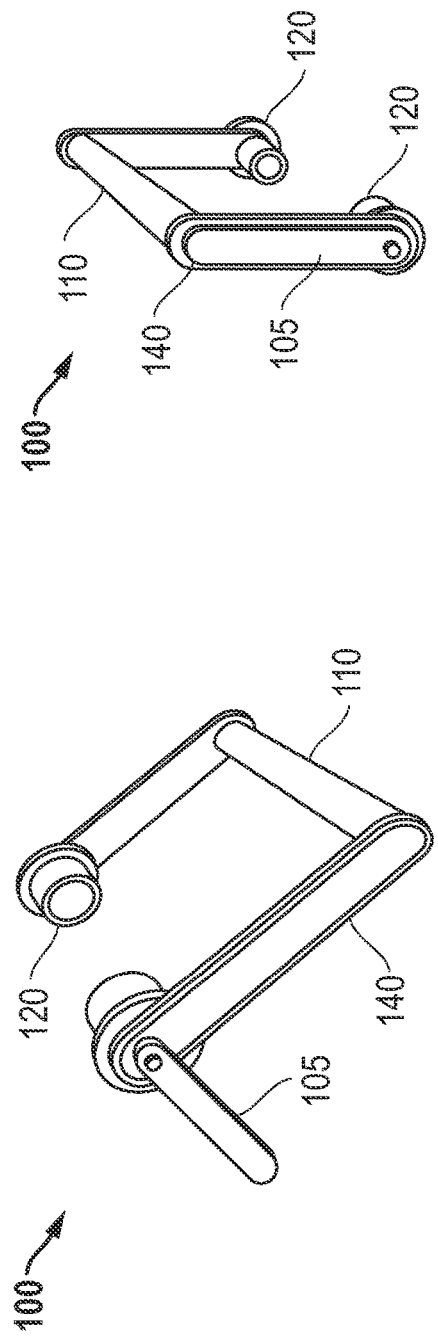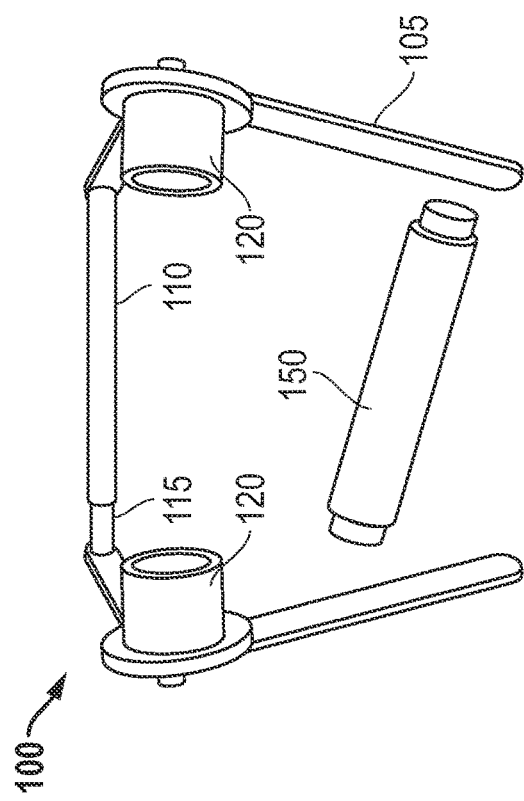

WIRE CADDY FOR TRANSPORTING AND DISPENSING WIRE OR CABLE

CROSS-REFERENCE TO RELATED APPLICATIONS

This application is a continuation of U.S. patent application Ser. No. 17/334,768, filed May 30, 2021, which has been granted as U.S. Pat. No. 11,472,457, issued on Oct. 18, 2022, which is a continuation of U.S. patent application Ser. No. 16/404,460, filed May 6, 2019, which issued as U.S. Pat. No. 11,040,733, issued on Jun. 22, 2021, which claims priority benefit to U.S. Provisional Application No. 62/667,490, filed May 5, 2018, all of which are incorporated herein in their entirety by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to an apparatus for transporting and dispensing wire or cable. More specifically, it relates to an adjustable wire caddy apparatus to attach to and assist in the transportation and dispensing of wire and cable from a variety of spool sizes.

2. Description of Related Art

Wires and cables used in housing and other industrial projects are often stored in devices that have an inner drum upon which the wire is spooled around, commonly known as reels or spools. Reels or spools are a common storage unit to package and dispense hundreds of feet of wire or cable. The reels or spools are often manufactured from plastic or wood. Wire from a reel or spool is often installed in conduit and electrical boxes by being dispensed directly from the reel or spool. Often there is a need to transport and dispense the reels or spools between certain areas around the jobsite, including transporting the reel or spool to the top of tall structures. Electrical wire, especially wire with copper conductors, is very dense, and large lengths of it can become quite heavy. Additionally, reels or spools are cumbersome and awkward to carry, thus making manual transportation difficult.

Prior art solutions exist for unspooling wire, however, these solutions are not designed for ease of carrying the reel or spool and do not provide for transportation of multiple sized reels or spools. Prior art solutions for the transportation of reels or spools include elevator lifts and cranes that are used to transport many items at once. These solutions are typically implemented with tall structures. While successful at transporting the reel or spools, these solutions are often quite expensive, difficult to install, and are not often not readily available until further into a construction project. Additionally, prior art carts are made specifically for transporting and holding wire spools during unwinding, but they are large and expensive, and difficult to move around the jobsite, especially if the jobsite is a tall structure. The prior art carts are often lifted by an elevator or crane when a vertical movement in the location is necessary. Further, there are several packaging solutions that can solve the problems of transporting wire by hand and/or holding wire while installing, however, these solutions must be implemented by the wire manufacturer and are: bulky; heavy; not easily storable with other tools; not adjustable for multiple packing sizes; not optimized for carrying and installing wire; and not robust enough to hold up to wear, tear and weather on an open-air job site.

Therefore, a need exists for an inexpensive apparatus that allows the user at a jobsite to easily attach the apparatus to a variety of sized reels or spools and allows for the easy transportation and dispensing of the wire or cable.

BRIEF SUMMARY OF THE INVENTION

The present disclosure is directed at an apparatus for transporting and dispensing wire or cable wound on a reel or spool. The apparatus according to one embodiment is a wire caddy that includes: a telescoping handle, two support structures, two spool center inserts for insertion in a spool, two moveable legs, the legs may be parallel with the two support structures during transportation of the spool and may be approximately perpendicular to the two support structures when dispensing wire or cable. Additionally, a multiple spool insert in the shape of a cylinder may be attached to the two spool center inserts to allow multiple spools to be attached to the wire caddy apparatus.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings:

FIG. 17 depicts a perspective view of one embodiment of the wire caddy apparatus.

FIG. 18 depicts a perspective view of one embodiment of a partially disassembled wire caddy apparatus.

FIG. 19 depicts a perspective view of one embodiment of the wire caddy apparatus with an unattached multiple spool insert.

DETAILED DESCRIPTION OF THE INVENTION

Figure 1:
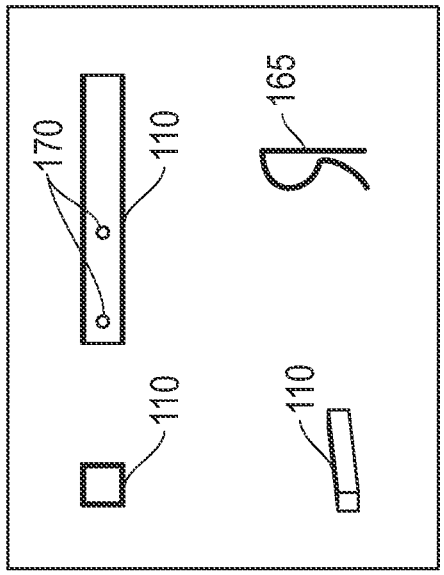
FIG. 1 depicts a front, side and perspective views of one embodiment of the leg of the wire caddy apparatus.
Figure 2:
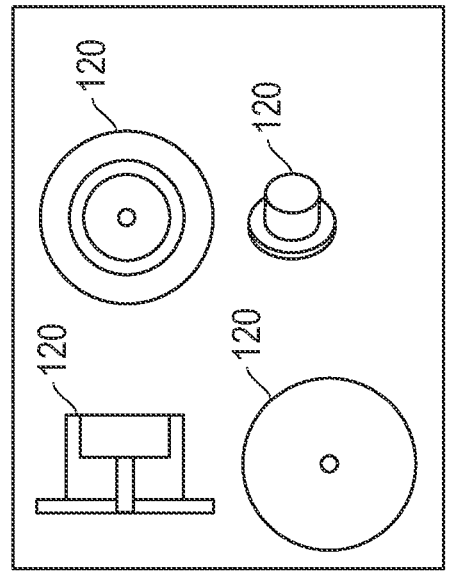
FIG. 2 depicts a front, side and perspective views of one embodiment of the outer handle structure of the wire caddy apparatus.
Figure 3:
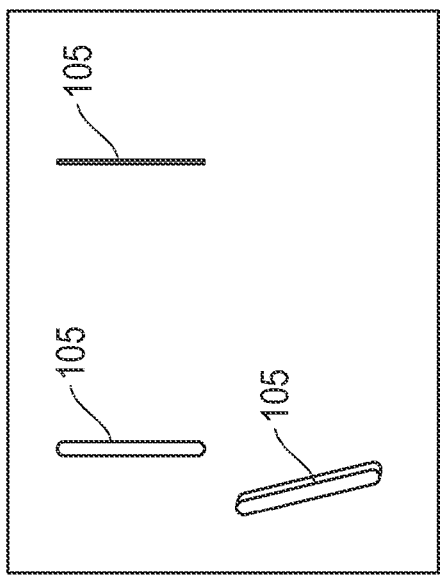
FIG. 3 depicts a front, side and perspective views of one embodiment of the inner handle structure of the wire caddy apparatus.
Figure 4:
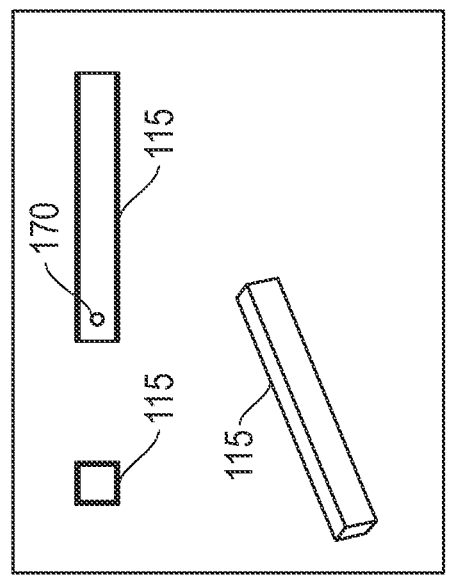
FIG. 4 depicts a front, side and perspective views of one embodiment of the spool center insert of the wire caddy apparatus.
Figure 5:
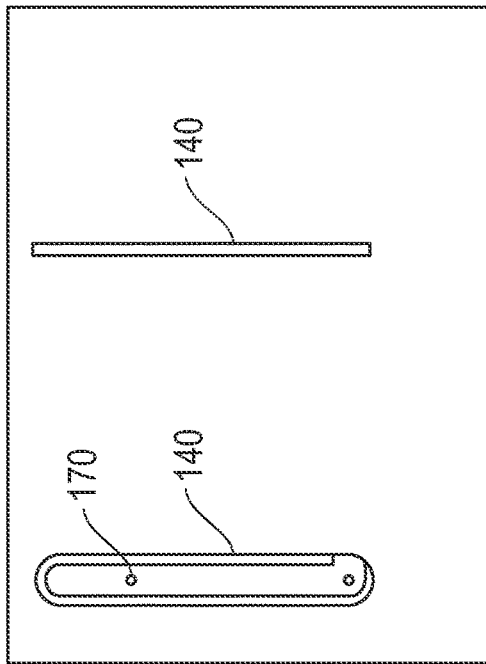
FIG. 5 depicts a front, side and perspective views of one embodiment of the support structure A of the wire caddy apparatus.
Figure 6:
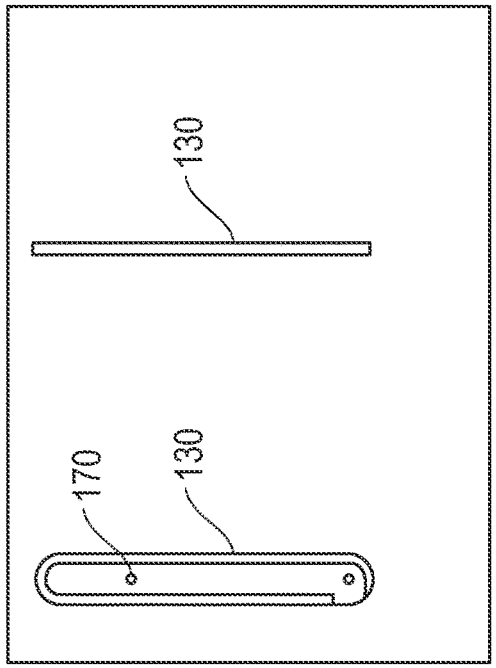
FIG. 6 depicts a front, side and perspective views of one embodiment of the support structure B of the wire caddy apparatus.
Figure 7:
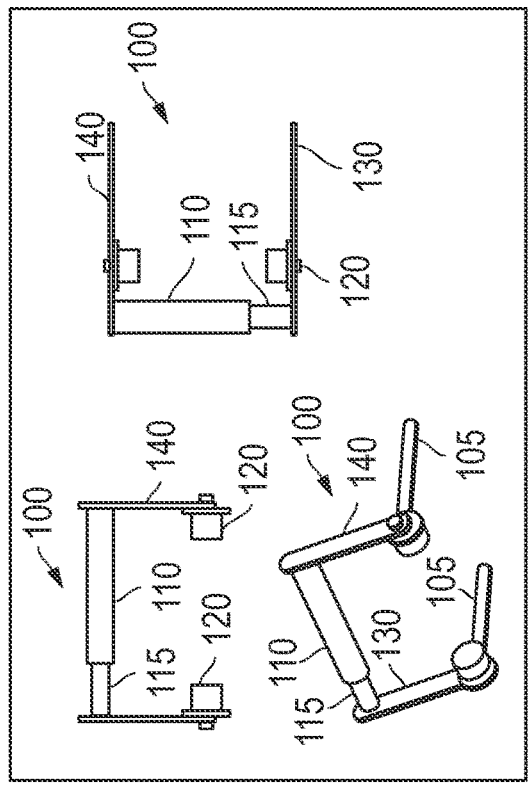
FIG. 7 depicts a front, side and perspective views of one embodiment of the wire caddy apparatus.
Figure 8:
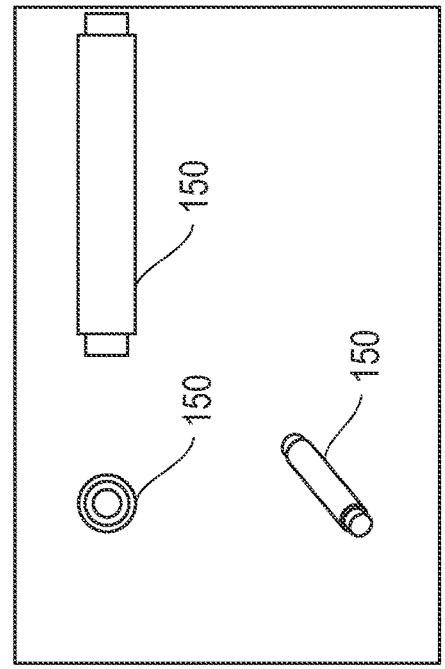
FIG. 8 depicts a front, side and perspective views of one embodiment of the multiple spool insert of the wire caddy apparatus.
Figure 9:
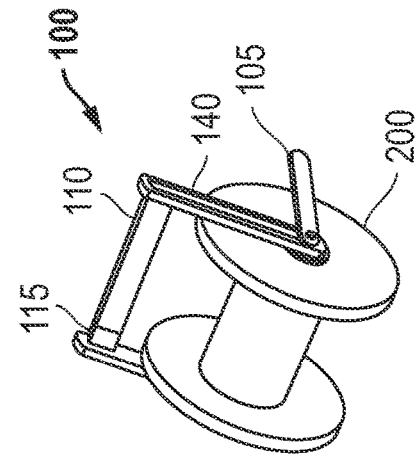
FIG. 9 depicts a perspective view of one embodiment of the wire caddy apparatus.
Figure 10:
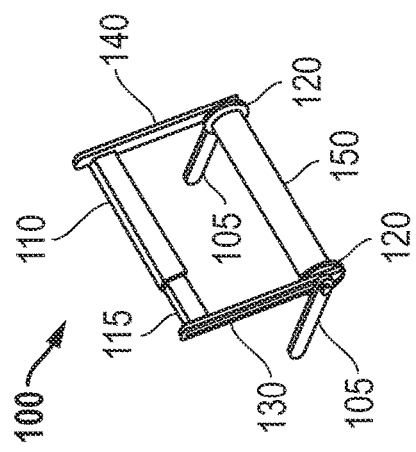
FIG. 10 depicts a perspective view of one embodiment of the wire caddy apparatus engaged with a spool.
Figure 11:
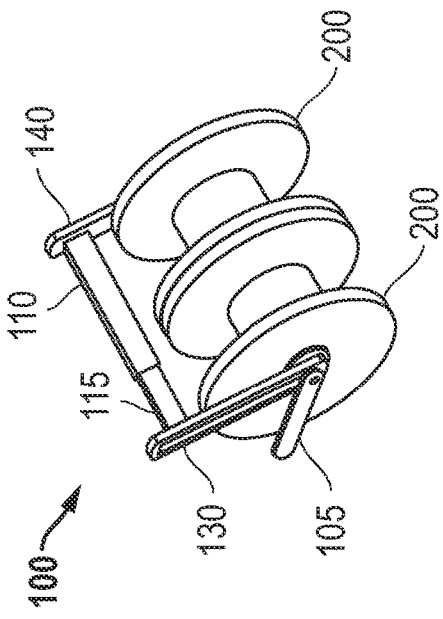
FIG. 11 depicts a perspective view of one embodiment of the wire caddy apparatus engaged with a spool.
Figure 12:
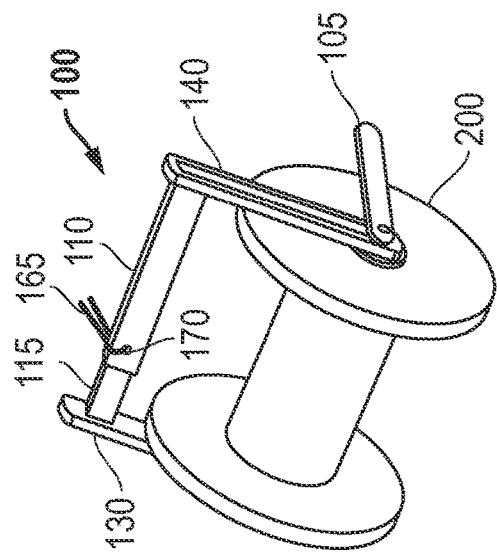
FIG. 12 depicts a perspective view of one embodiment of the wire caddy apparatus engaged with multiple spools.
Figure 13:
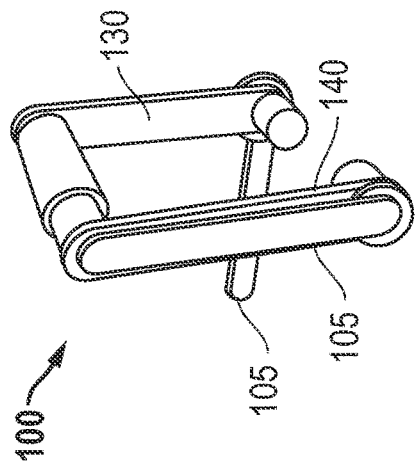
FIG. 13 depicts a perspective view of one embodiment of the wire caddy apparatus.

Before explaining at least one disclosed embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by accompanying claims.

The present disclosure is described below with reference to the Figures in which various embodiments of the present invention are shown. The subject matter of the disclosure may, however, be embodied in many different forms and should not be construed as limited to the exemplary embodiments set forth herein. It is also understood that the term "wire" is not limiting, and refers to wires, cables, electrical lines, or any other materials that are dispensed from a reel.

The present invention provides for an apparatus for transporting spools of spooled wire and dispensing wire from the spool during installation of the wire. The apparatus is designed to make it easier to transport and dispense spools of wire on a jobsite. The apparatus is capable of adjusting to multiple configurations to accommodate the different sizes of spools and reels. The apparatus allows a user to easily carry the spool by hand and lock the spool and apparatus in place during installation.

Referring now to FIGS. 1-21, exemplary wire caddy apparatus 100 is shown. The apparatus 100 includes a telescoping adjustable handle including an outer handle structure 110 and an inner handle structure 115. The handle is formed from two or more separate pieces, for example the outer handle structure 110 and the inner handle structure 115, that when combined, form a complete handle. In one embodiment the handle is formed from a single, continuous piece of material and is designed for a specific size spool and is not adjustable. The apparatus 100 may be formed from a wide variety of materials without detracting from the spirit of the invention including, but not limited to, plastic, metal, or wood. The handles of the apparatus 100 may be a variety of shapes, including, round and square, without detracting from the spirit of the invention. At each side of the handle, support structure A 130 and support structure B 140 descend down from the handle and the distal ends of the support structures A 130 and B 140 connect with spool center inserts 120 designed to fit in a reel arbor hole. Support structures A 130 and B 140 are adjustable to allow for a variety of spool or reel sizes. When the handle is extended or disassembled, it can be placed on either side of a spool or reel 200 and shortened/reassembled so that the spool center inserts 120 rest within the arbor hole of each flange of the reel 200. The apparatus 100 is locked in place allowing the reel to be lifted by the handle with the full weight being supported by the apparatus.

Figure 14:
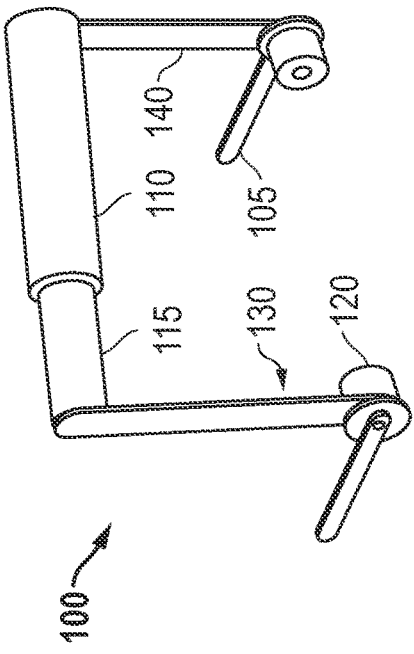
FIG. 14 depicts a perspective view of one embodiment of the wire caddy apparatus.
Figure 15:
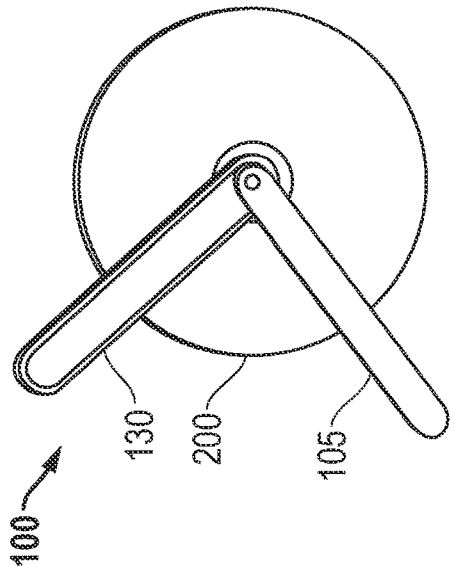
FIG. 15 depicts a perspective view of one embodiment of the wire caddy apparatus engaged with a spool.
Figure 16:
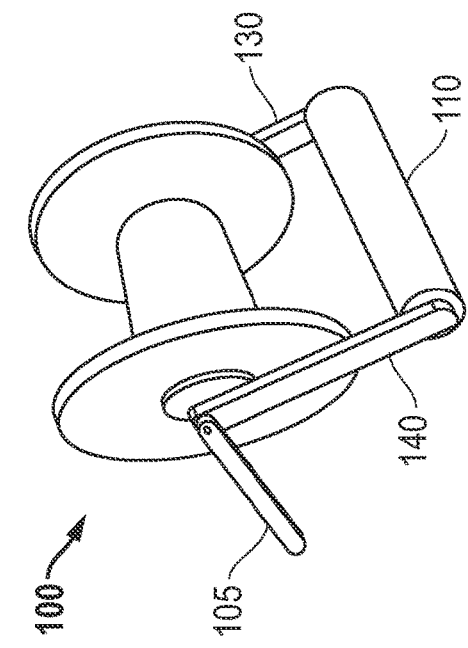
FIG. 16 depicts a side view of one embodiment of the wire caddy apparatus engaged with a spool.
Figure 21:
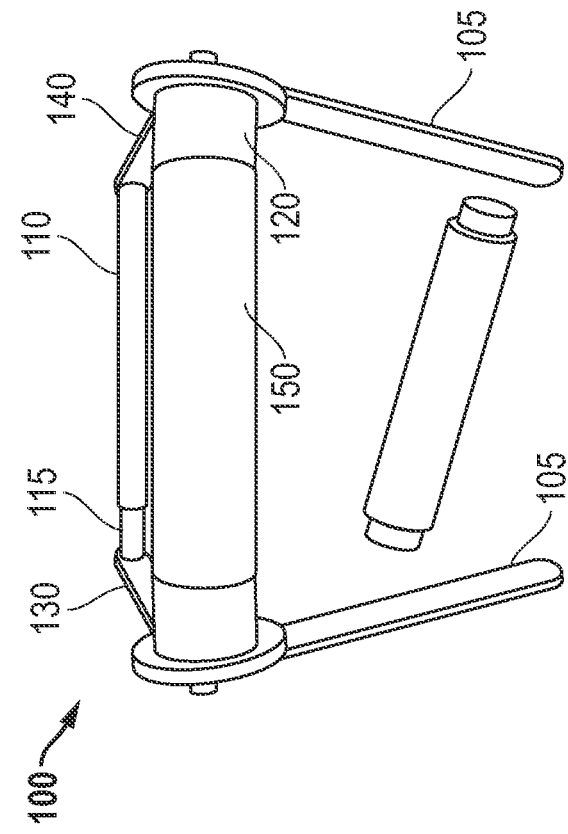
FIG. 21 depicts a perspective view of one embodiment of the wire caddy apparatus with an attached multiple spool insert.
Figure 20:
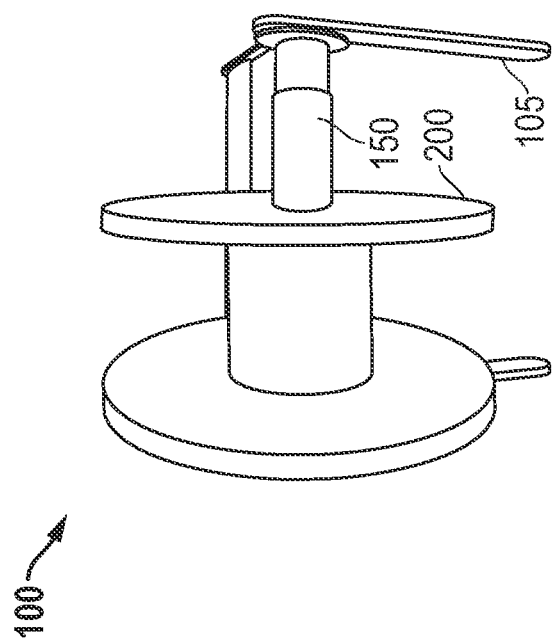
FIG. 20 depicts a perspective view of one embodiment of the wire caddy apparatus with the multiple spool insert engaged with a spool.

The support structures A 130 and B 140 that connect the spool center inserts 120 to the handle also act as storage for a leg 105. Once the spool or reel 200 is transported to a location and ready to dispense the wire or cable, the legs 105 are adjusted so that they are held at a 90-degree angle from the support structures A 130 and B 140. At this point, the reel 200 is suspended off the ground with the handle and legs 105 acting as feet, as is shown in FIG. 15. In this position, the reel 200 can spin freely without obstruction and the wire can be dispensed without placing it on a second device. This reduces the amount of tools you need and the weight you need to transport to each location. When not in use, these legs 105 can be folded on the rotational axis and nested into the support structures A 130 and B 140. As shown in FIG. 14, leg 105 is at approximately a 90-degree angle from support structure A 130 while the other leg 105 is folded and nested into or placed against or adjacent to the support structure B 140. In another embodiment, when not in use, these legs 105 can be folded on the rotational axis and placed against the support structures A 130 and B 140. The legs 105 may be of a set length or may be adjustable to various length to accommodate multiple sizes of reels 200. The legs 105 length may be adjusted with locking pins or a pressure device, however, a wide variety of extension and holding apparatus may be implemented without detracting from the spirit of the invention.

Locking pins 165 hold the adjustable handle and support structures A 130 and B 140 in place. With regard to the handle, a pin hole 170 is provided in the outer handle structure 110 and multiple pin holes 170 are provided in the inner handle structure 115. The width of the handle is adjusted by moving the outer handle structure 110 over the inner handle structure 115 so that the distance between the support structures A 130 and B 140 is approximately equal to the width of the spool 200. The locking pin 165 is then inserted into the pin holes 170 for the outer handle structure 110 over the inner handle structure 115 once the specific size is determined. In this embodiment, there are multiple pin holes 170 and locking locations for multiple sizes and widths of spools 200. The handle can be held in position with a locking pin 165 or any locking device, or held in any way possible such that the supports can be moved and locked for multiple reel sizes. The length of the support structures A 130 and B 140 are also adjustable. Locking pins 165 and pin holes 170 can be implemented for the support structures A 130 and B 140. In this embodiment, an extension support is moved along the long axis of the support structures A 130 and B 140 to accommodate the depth of the spool 200. When the desired length is achieved, a locking pin 165 may be inserted in to the pin holes 170. In another embodiment, a pressure device is used to extend and lock the length of the support structures A 130 and B 140. A wide variety of extension and holding apparatus may be implemented without detracting from the spirit of the invention.

In one embodiment, a multiple spool insert 150 in the shape of a cylindrical rod of smaller or equivalent diameter to the spool center inserts 120 extends between each spool center insert 120 on each support structures A 130 and B 140. The multiple spool insert 150 is attachable and removable. The multiple spool insert 150 allows for multiple reels or spools 200 to be carried at the same time by the apparatus 100 and allows for the wire or cable to be dispensed freely of the other spool 200. The multiple spool insert 150 is attached to one of the spool center inserts 120. One or more spools 200 are then placed over the multiple spool insert 150. Once all of the spools 200 have been attached, the other spool center insert 120 is attached to the multiple spool insert 150.

In one embodiment, while the apparatus 100 is not being used, the support structures A 130 and B 140 may be removed or telescoped in all the way to reduce size. The apparatus 100 is lightweight and easy to store in a toolbox with other tools.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The preceding discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown, but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

The various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as "first" and "second" are used to arbitrarily distinguish between the elements such terms describe. Thus, these terms are not necessarily intended to indicate temporal or other prioritization of such elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the field or any related fields are intended to be within the scope of the following claims.

What is claimed is:

1. An apparatus for the transportation and dispensing of spooled wire or cable, the apparatus comprising:
    a handle, wherein the handle has a first end and a second end and wherein the handle connects to a spool;
    a first leg moveably attached to the first end of the handle; and
    a second leg moveably attached to the second end of the handle, wherein the second leg is movable independent of the first leg.

2. The apparatus of claim 1, wherein the handle further comprises:
    an outer handle structure with a hollow core; and
    an inner handle structure, wherein the inner handle structure is inserted into a portion of the outer handle structure hollow core.

3. The apparatus of claim 2, wherein the inner and outer handle structures comprise locking holes.

4. The apparatus of claim 3 further comprising a locking pin, wherein the locking pin is inserted into the locking holes of the inner and outer handle structure when the locking holes are aligned.

5. The apparatus of claim 1, wherein the first and second legs further comprises adjustable leg lengths.

6. The apparatus of claim 1, wherein the first leg is moveably located adjacent to the first end of the handle and the second leg is moveably located adjacent to the second end of the handle.

7. The apparatus of claim 6, wherein the first leg is moveably located at approximately a 90-degree angle to the first end of the handle and the second leg is moveably located at approximately a 90-degree angle to the second end of the handle.

8. The apparatus of claim 1, wherein the handle connects to a first arbor hole and a second arbor hole of the spool.

9. The apparatus of claim 8, wherein the first end of the handle connects to the first arbor hole and the second end of the handle connects to the second arbor hole.

10. A spooled wire or cable system, the system comprising:
    a spool;
    a handle removably connected to the spool, wherein the handle has a first end and a second end;
    a first leg moveably attached to the first end of the handle;
    a second leg moveably attached to the second end of the handle, wherein the second leg is movable independent of the first leg.

11. The system of claim 10, wherein the handle further comprises:
    an outer handle structure with a hollow core; and
    an inner handle structure, wherein the inner handle structure is inserted into a portion of the outer handle structure hollow core.

12. The system of claim 11, wherein the inner and outer handle structures comprise locking holes.

13. The system of claim 12 further comprising a locking pin, wherein the locking pin is inserted into the locking holes of the inner and outer handle structure when the locking holes are aligned.

14. The system of claim 10, wherein the first and second legs further comprises adjustable leg lengths.

15. The system of claim 10, wherein the first leg is moveably located adjacent to the first end of the handle and the second leg is moveably located adjacent to the second end of the handle.

16. The system of claim 15, wherein the first leg is moveably located at approximately a 90-degree angle to the first end of the handle and the second leg is moveably located at approximately a 90-degree angle to the second end of the handle.

17. The system of claim 10, wherein the spool of wire or cable is elevated off the ground when the first and second legs and the handle are in contact with the ground.

18. The system of claim 10, wherein the handle connects to a first arbor hole and a second arbor hole of the spool.

19. The system of claim 18, wherein the first end of the handle connects to the first arbor hole and the second end of the handle connects to the second arbor hole.

20. The system of claim 10, wherein the spool further comprises a spool or wire or cable.

* * * * *